United States Patent [19]

Tatsumi et al.

[11] 4,433,592
[45] Feb. 28, 1984

[54] BALANCER FOR USE IN CENTRIFUGAL ROTARY MACHINE

[75] Inventors: Hisao Tatsumi; Michiaki Ito, both of Nagoya, Japan

[73] Assignee: Tokyo Shibaura Denki Kabushiki Kaisha, Kawasaki, Japan

[21] Appl. No.: 411,005

[22] Filed: Aug. 24, 1982

[30] Foreign Application Priority Data

Aug. 26, 1981 [JP] Japan .................. 56-133628

[51] Int. Cl.³ .................. F16F 15/22; D06F 37/24
[52] U.S. Cl. .................. 74/573 F; 68/23.2; 210/144
[58] Field of Search .......... 210/363, 144, 364; 68/23.2; 74/573 R, 573 F; 494/82

[56] References Cited

U.S. PATENT DOCUMENTS 2,984,094  5/1961  Belaieff .................. 68/23.2

FOREIGN PATENT DOCUMENTS 51-51680  4/1971  Japan .
51-11147  3/1977  Japan .
52-49667  4/1977  Japan .................. 68/23.2
53-17661  5/1978  Japan .
54-26071  2/1979  Japan .................. 68/23.2
54-120957  9/1979  Japan .................. 494/82
345322  5/1960  Switzerland .................. 68/23.2

Primary Examiner—Philip R. Coe
Attorney, Agent, or Firm—Cushman, Darby & Cushman

[57] ABSTRACT

A balancer for use in a centrifugal rotary machine comprises an annular casing having inside an annular receiving chamber and equipped to the rotary tub coaxially therewith. A low-viscous operating liquid is sealed into the annular receiving chamber so as to be flowable in the circumferential direction of the chamber. The operating liquid flows, as the rotary tub rotates, to the side opposite to that on which the unbalanced load of the rotary tub is located absorb the unbalance of the rotary tub. A plurality of spherical weights are disposed circumferentially and movably in the annular receiving chamber and, as the rotary tub rotates, move to the side opposite to that on which the unbalanced load of the rotary tub is located to absorb the unbalance of the rotary tub.

9 Claims, 8 Drawing Figures

BALANCER FOR USE IN CENTRIFUGAL ROTARY MACHINE

BACKGROUND OF THE INVENTION

This invention relates to a balancer for use in a centrifugal rotary machine, and more particularly, to a balancer for use in a centrifugal rotary machine which is designed to reduce the abnormal vibration of the support means for supporting a cylindrical rotary tub, which occurs due to the unbalanced distribution of an article in the rotary tub.

For example, in an electric washing machine with a dehydrating function, the cylindrical rotary tub which houses washing is often abnormally vibrated during the dehydrating operation due to the unbalanced distribution of the washing. The suspended tub which supports as support means the rotary tub is abnormally vibrated by the vibration of the rotary tub. Generally, such a rotary tub is equipped with a balancer in order to prevent this abnormal vibration. Examples of this type of balancer are a solid balancer, a liquid balancer, and a ball balancer.

The solid balancer is a ring-like weight which is coaxially disposed on the inner circumferential surface of the rotary tub. This solid balancer is designed to increase the moment of inertia of the rotary tub, thereby reducing the amplitude of the rotary tub caused by an unbalanced load.

The liquid balancer uses liquid as a balancing weight, said liquid being flowably sealed into a cylindrical casing coaxially equipped to the rotary tub. When the rotary tub is rotated at a rotating rate higher than that corresponding to the resonance rotating rate, the liquid moves toward the side opposite to that on which the washing is loaded, i.e., that on which the unbalancing load is located, thereby absorbing the unbalance of the rotary tub. Thus, the vibration of the suspended tub is decreased. Although the liquid balancer can cope with a relatively wide variety of weights of unbalanced loads, it has the drawback of failing to zero the vibration amplitude of the rotary tub.

The ball balancer uses a steel-made ball, or spherical body or bodies, as a balancing weight, said balls being circumferentially and movably disposed in an annular casing, as in the liquid balancer. The ball has the characteristic that when the rotary tub is rotated at a higher rotating rate than that corresponding to the resonance rotating rate, the ball is moved to the side opposite to that on which the unbalancing load is located, thereby zoning the amplitude of the vibration of the rotary tub. On the other hand, however, the ball has the drawback that when the rotary tub is rotated at a lower rotating rate than that corresponding to the resonance rotating rate, the ball does not rotate integrally with the rotary tub but moves freely throughout the interior of the casing independently of the location of the unbalancing load in the rotary tub, thereby increasing the tub's unbalance. In order to rectify this drawback, a ball balancer has heretofore been proposed in which the balls are sealed into the casing together with a small amount of highly viscous liquid. The balls come to rotate integrally with the rotary tub in a short period of time due to the viscosity of the liquid, thus eliminating the disadvantage mentioned above. That type of ball balancer, however, has the shortcoming that while the rotary tub is making a normal rotation, it becomes impossible due to the viscosity of such liquid for each ball to move smoothly to a theoretical position. For this reason, the amount of movement of the balls in such a ball balancer depends on chance or uncertain conditions, resulting in a variation of the vibration-reducing effect of the balls with respect to the same weight of unbalanced load.

The respective characteristics of the said balancers will now be compared with reference to an electric washing machine 10 with a dehydrating function such as, for example, that shown in FIG. 1. The washing machine 10 will first be described. The washing machine 10 comprises an outer case 12, a suspended tub 16 as support means elastically suspended within the outer case 12 by means of suspension bars, and a rotary tub 18 rotatably supported in the suspended tub and used for washing, rinse and dehydration. In the rotary tub 18 a stirring vane 20 is disposed. The rotary tub 18 and the stirring vane 20 are selectively driven by a motor through a power transmission mechanism 22. A balancer 26 is equipped to the upper end portion of the inner circumferential portion of the rotary tub 18. FIG. 2 is a linear diagram showing the respective characteristics of the solid balancer, liquid balancer and ball balancer in relation to the said washing machine 10. In FIG 2, Q represents the weight of unbalanced load in the rotary tub resulting from the biased location of a washing in the rotary tub 18, while A represents the vibration amplitude of the suspended tub 16. In FIG. 2, numeral 28 indicates a characteristic line of the solid balancer when the same was used as the balancer 26. Numeral 30 indicates a characteristic line of the liquid balancer when used as the balancer 26. Numerals 32, 33 indicate characteristic lines of the ball balancer when used as the balancer 26. The characteristic line 32 indicates a case in which the rotary tub 18 is formed of a material difficult to bend, such as metal, while the characteristic line 33 is used when the rotary tub is formed of a material likely to bend, such as plastic. The characteristic lines 28, 30 and 32 will now be compared with each other under the condition in which the rotary tub is formed into an ideal structure which is not bent whatsoever. As shown by the characteristic line 32, the ball balancer has the best vibration-reducing performance, and the liquid balancer has the second best vibration reducing performance. However, because the rotary tub 18 is generally formed of plastic material of high productivity, the vibration-reducing performance of the ball balancer is actually that shown by the characteristic line 33. This means that the performance of a ball balancer is lower than that of the liquid balancer.

Hereinafter, the technical phenomena occurring when the rotary tub 18 is bent or flexed will be explained with reference to FIGS. 3 to 5. In FIG. 3, there are schematically shown the rotary tub 18 housing a washing 34, constituting an unbalanced load, and a ball balancer 38 having a plurality of balls or spherical bodies 36 and equipped to the rotary tub 18. In FIGS. 4 and 5, the ball balancer 38 and the rotary tub 18 are schematically shown to include the suspended tub 16 and a drive shaft 40. FIG. 3 shows the state in which the washing 34 is distributed in an unbalanced manner when the rotary tub 18 is rotated at a higher rate than that corresponding to the resonance rotating rate or at a rate corresponding to normal rotating rate. A centrifugal force $f_b$ produced around the rotational center axis (line $P_1-P_2$) acts on each spherical body 36, and component forces $f_1$ and $f_2$ of the centrifugal force $f_b$ are existent. Because of this resultant force $f_2$, each spherical body 36 is circumferentially moved to the side opposite to that on which the unbalanced load 34 is located, namely, to the lower-load side of the rotary tub 18. Each spherical body 36 is moved to the said oppositeside of the rotary tub 18 until the rotational center point $P_2$ is brought to coincide with the rotational center point $S_3$ of the balancer 38, i.e., until the vibration amplitude of the rotary tub 18 is zeroed. The ball balancer 38 thereby absorbs the unbalance of the rotary tub 18 and thus acts to reduce the vibration of the rotary tub.

Where the rotary tub 18 is formed of metal, the marginal unbalance-absorption point of the ball balancer 38 is located at the position $R_1$ of the characteristic line 32 shown in FIG. 2. At that marginal unbalance-absorption point, the spherical bodies 36 of the ball balancer 38, as shown in FIG. 3, continue to abut on each other. In other words, they remain gathered together. When the weight of the unbalanced load in the rotary tub 18 is increased and exceeds a value corresponding to the said marginal unbalance-absorption point, the ball balancer 38 becomes unable to absorb the unbalance of the rotary tub. As a result, as shown by the line portion of the characteristic line 32 extending from the point $R_1$ in the rightward direction of the illustration, the variation amplitude of the suspended tub 16 increases sharply.

Further, where the rotary tub 18 is formed of plastic material, the rotary tub is bent as shown in FIG. 4. When each spherical body 36 is moved circumferentially around the rotary tub 18 to the opposite side thereof where the unbalanced load 34 is located, the rotary tub is shifted until the rotational center point $P_2$ is brought to coincide with the rotational center point $S_3$ of the balancer 38. That shift is due to a resultant force $F_b$ of the respective centrifugal forces of the spherical bodies 36. However, where the rotary tub 18 is formed of plastic material, the rotary tub, upon receipt of such resultant force $F_b$, is shifted as above only at the upper end portion. That is, the rotary tub 18 is bent so that the position of its upper end portion may be shifted by $\Delta a$ relative to the center axis (line $S_1$-$S_2$) of the rotary tub. As a result, the rotational center axis (line $P_1$-$P_2$) is deviated by the amount of flexure $\Delta a$ from the center axis (line $S_1$-$S_2$) of the rotary tub 18. Accordingly, though the vibration amplitude of the rotary tub 18 is zeroed, that of the suspended rub 16 fails to be zeroed due to the existance of said $\Delta a$ deviation. The vibration-reducing characteristic of the ball balancer is thus as indicated by the characteristic line 33 of FIG. 2. When the unbalanced load is a larger one, each spherical body 36 is further moved to the side opposite to that on which the unbalanced load 34 is located, and the resultant force $F_b$ acting on the rotary tub 18 increases. As a result, the amount of flexure $\Delta a$ of the rotary tub 18 further increases, so that the vibration-reducing action of the ball balancer 38 decreases even more. As shown by the point $R_2$ of FIG. 2, at the marginal unbalance-absorption point of the ball balancer 38 at which the spherical bodies 36 are kept together, the resultant force $F_b$ of the centrifugal forces acting on the spherical bodies reaches it maximum. Thus, the amount of flexure also reaches its maximum. Thereafter, even when the weight of the unbalanced load is increased to exceed a value corresponding to the marginal unbalance-absorption point $R_2$, said resultant force $F_b$ does not increase and the amount of flexure $\Delta a$ of the rotary tub 18 is kept constant. The amplitude of the vibration of the rotary tub 18 occurring due to an unbalanced load greater in weight than the unbalanced load corresponding to the marginal unbalance-absorption point $R_2$ differs 180° in phase from the amount of flexure $\Delta a$ of the rotary tub. Therefore, after the marginal point $R_2$ is reached, the center point of the suspended tub 16, with a further increase in the weight of the unbalanced load therein, gradually approaches the rotational center point $P_2$. As indicated by the point $R_3$ in FIG. 2, the vibration amplitude of the suspended tub 16 is eventually zeroed. Thereafter, when the weight of unbalanced load is further increased, the positional relationship of $S_2$ with $P_2$ is reversed, as shown in FIG. 5. As indicated by the point $R_3$ and the succeeding line portion of the characteristic line 33 of FIG. 2, the vibration amplitude of the suspended tub 16 is once again increased.

As stated above, the ball balancer has the best vibration-reducing action. If the rotary tub is formed of plastic material, its vibration amplitude is reduced due to its flexure nearly to zero after the marginal unbalance-absorption point of the ball balancer is reached, then it is once again increased. However, in this case, the vibration amplitude of the suspended tub is rapidly decreased and, with only a slight additional increase in the weight of unbalance load, is once again increased. For this reason, as indicated in the characteristic line 33 of FIG. 2, in the region where the weight of unbalanced load is relatively great, the vibration-reducing action or unbalance-absorbing action of the ball balancer varies greatly relative to the slight variation of the weight of unbalanced load. Accordingly, the ball balancer with this unbalance-absorbing action fails to give a stable vibration and noise reducing effect when put to practical use.

There has also been proposed an electric washing machine with a dehydrating function, the rotary tub of which is equipped with a plurality of ball balancers and liquid balancers (Japanese Utility Model Laid-Open No. 51680/76). This type of washing machine can be expected to have an excellent vibration-reducing effect by combining the respective characteristics of the liquid balancer and ball balancer. However, it has the drawback that the rotary tub is complicated in structure, thus increasing the manufacturing cost. Further, because the outer circumferential surface of the rotary tub is surrounded by the balancers, the rotary tub can not be formed with a large number of dehydrating openings. As a result, the dehydrating performance of the washing machine is degraded. Further, no measures are taken to prevent the ball and liquid balancers from making unruly movements at the starting time of the rotary tub. Thus, such a washing machine has the drawbacks of noise generation due to the collision of one spherical body against another and an increase in the vibration of the rotary tub.

SUMMARY OF THE INVENTION

The present invention was developed in view of the above drawbacks. Accordingly, its object is to provide a constructionally simplified balancer for use in centrifugal rotary machine which, even where the rotary tub is formed of flexible material such as plastic material, results in only a small variation in the unbalance-absorbing action relative to the variation of the weight of unbalanced load, and which has a vibration-reducing effect greater than that of the liquid balancer.

According to one aspect of the invention, the balancer for use in a centrifugal rotary machine comprises an annular casing having inside the same an annular receiving chamber and equipped to the rotary tub coaxially with the same. It further comprises a low-viscous operating liquid circumferentially and flowably sealed into said annular receiving chamber and flowing to the side opposite to that on which the unbalanced load of the rotary tub is located to absorb the unbalance of the rotary tub as it rotates. Finally, it comprises a plurality of spherical weights circumferentially and movably disposed in said annular receiving chamber and, as the rotary tub rotates, moved to the side opposite to that on which the unbalanced load of the rotary tub is located to absorb the unbalance of the rotary tub.

According to the balancer of the invention, an operating liquid and a plurality of weights are housed in one receiving chamber. This balancer has the characteristic not only of the liquid balancer but also of the ball balancer. Therefore, even if the rotay tub of the centrifugal rotary machine is formed of a flexible material such as plastic, the amplitude of variation of the unbalance-absorbing action relative to the variation in the weight of unbalanced load can be decreased. Further, when the rotary tub is not bent or flexed at all, and when it is flexed, the balancer of the invention makes it possible to obtain a vibration and noise reducing effect greater than that of the liquid balancer. Further, according to the balancer of the invention, such action or effect can be achieved by a simple construction in which the operating liquid and weights are housed in the same receiving chamber.

BRIEF DESCRIPTION OF THE DRAWINGS

FIG. 6 is a vertically sectional view showing a part of the balancer; and FIG. 7 is a plan view thereof partly broken; and FIG. 8 is a characteristic linear diagram of the respective vibration-reducing actions of a prior art belancer and a balancer according to the embodiment of the invention.

DETAILED DESCRIPTION OF THE PREFERRED EMBODIMENT

Hereinafter, a balancer according to an embodiment of the invention which is applied to an electric washing machine 10 with the dehydrating function shown in FIG. 1 will be explained in detail with reference to the drawings.

Figure 1:
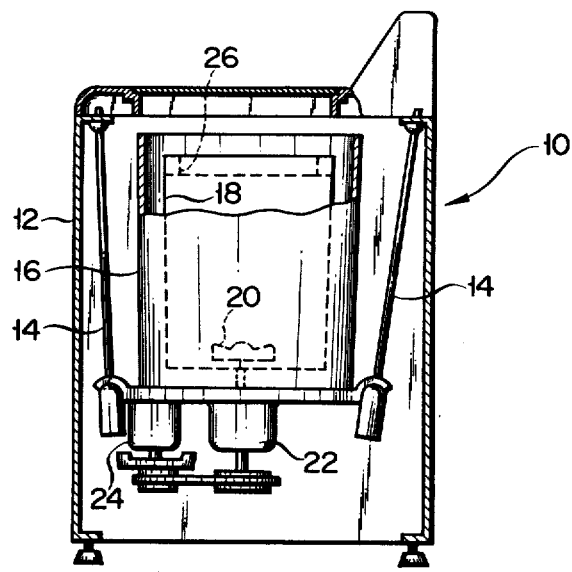
FIG. 1 is a vertically sectional view showing a general electric washing machine with a dehydrating function.
Figure 6:
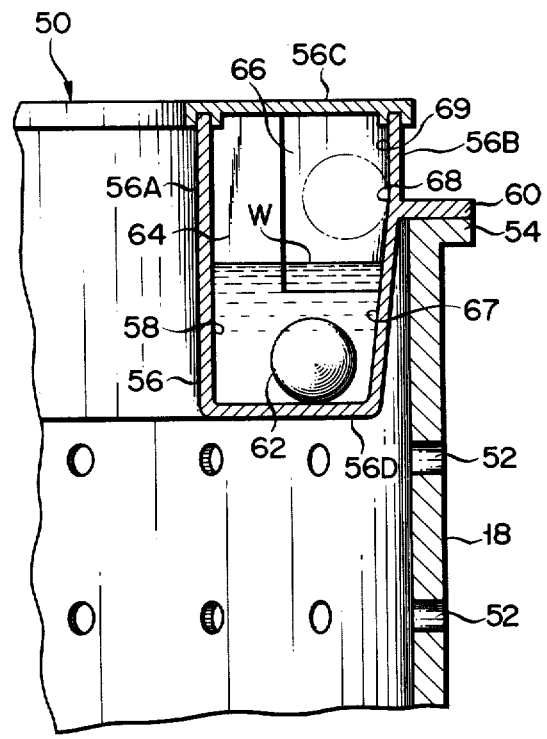
FIGS. 6 and 7 show a balancer according to an embodiment of the invention.
Figure 7:
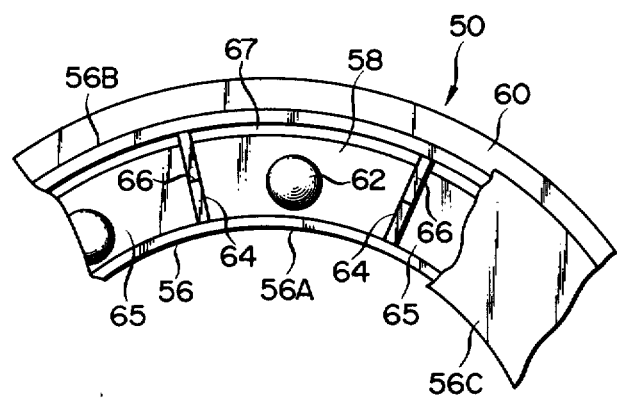

As shown in FIGS. 6 and 7, a balancer 50 is equipped to a cylindrical rotary tub 18 in place of the balancer 26 (see FIG. 1). The rotary tub 18 is made of plastic material and has a number of dehydrating openings formed in its circumferential wall. Further, the rotary tub 18 has an outwardly protruded flange portion 54 at the outer circumferential edge of its upper end. The rotary tub 18, as well known, functions as a washing tub during the washing period and also functions, by being rotated at high rotating rate, as a centrifugal dehydrating tub during the dehydrating period.

The balancer 50 has an annular casing 56 provided, coaxially with the rotary tub 18, to the upper end portion thereof. The casing 56 has an inner circumferential wall 56A and an outer circumferential wall 56B opposed thereto, and also has an upper wall 56C and a bottom wall 56D opposed thereto. The upper wall 56C is fitted over the respective upper end portions of the inner circumferential wall 56A and outer circumferential wall 56B. An annular receiving chamber 58 whose vertical section assumes a substantially rectangular form is defined by walls 56A, 56B, 56C and 56D. That chamber 58 is located coaxially with the rotary tub 18. Further, the outer diameter of the casing 56 is set at a value smaller than that of the inner diameter of the rotary tub 18. Further, the casing 56 has a supporting portion 60 extending outwards from its outer circumferential wall 56B in the radial direction of the casing 56, said supporting portion being fixed to the flange portion 54 of the rotary tub 18 by means of, for example, screws. The casing 56 is arranged on the inside of the upper portion of the rotary tub 18.

The receiving chamber 58 is stored with a circumferentially flowable operating liquid W and a plurality of circumferentially movable spherical bodies 62. The annular casing 56 has a plurality of partitioning walls 64, which are disposed within the receiving chamber 58 equidistantly spaced from each other in the circumferential direction of the annular casing. Those partitioning walls 64 thus divide the receiving chamber 58 into a plurality of compartments 65. Each partitioning wall 64 regulates the respective circumferential movements of the operating liquid W and spherical bodies 62. Further, each partitioning wall 64 has a substantially rectangular opening 66 formed at the part of its upper half portion located on the side of the outer circumferential wall 56B of the casing 56. Each opening 66 is formed into a size greater in length and width than the diameter of the spherical body 62.

Any two adjacent compartments 65 communicate with each other through the opening 66 of the corresponding partioning wall 64 located between those two compartments. The operating liquid W and spherical body 62 in the receiving chamber 58 are circumferentially movable through the opening 66. The inner surface of the outer circumferential wall 56B has an inclined portion 67 extending upwards from the inner surface of the bottom wall 56D and inclined in the outward direction as taken radially of the annular casing. It also has a vertical portion 69 extending upwardly from a terminal end 68 of that inclined portion 67 up to the inner surface of the upper wall 56C. The terminal end 68 of the inclined portion 67 is located inside the opening 66. The distance between the terminal end 68 of the inclined portion 67 and the inner surface of the upper wall 56C is made larger than the radius of the spherical body 62. The distance between the terminal end 68 and the lower edge of the opening 66 is also made larger than the radius of the spherical body 62.

The spherical bodies 62 serving as a weight, in order to prevent the production of noises due to collision with each other, as well as to prevent the their corrosion are formed of elastic material such as synthetic resin or natural rubber containing powdered lead oxide. According to the embodiment of the invention, four spherical bodies 62 are housed in the receiving chamber 58.

The amount of the operating liquid W housed together with the spherical bodies 62 in the receiving chamber 58 is set at a value great enough to permit the liquid W to perform its function as a liquid balancer. In other words, the amount of the operating liquid W is preferably set at a value making the receiving chamber 58 not full of the operating liquid W and keeping the liquid surface level in the chamber 58 to be located within the opening 66. According to this embodiment, the amount of the operating liquid W is set at a value corresponding to approximately 50% of the capacity of the receiving chamber 58. Further, the operating liquid W is preferably a liquid which has low viscosity so as not to obstruct the movement of the spherical bodies 62, namely, water or a liquid containing water as a basic component. In this embodiment, the operating liquid W is a 20% solution of salt.

The operation of the balancer 50 having the foregoing construction will now be explained.

Figure 2:
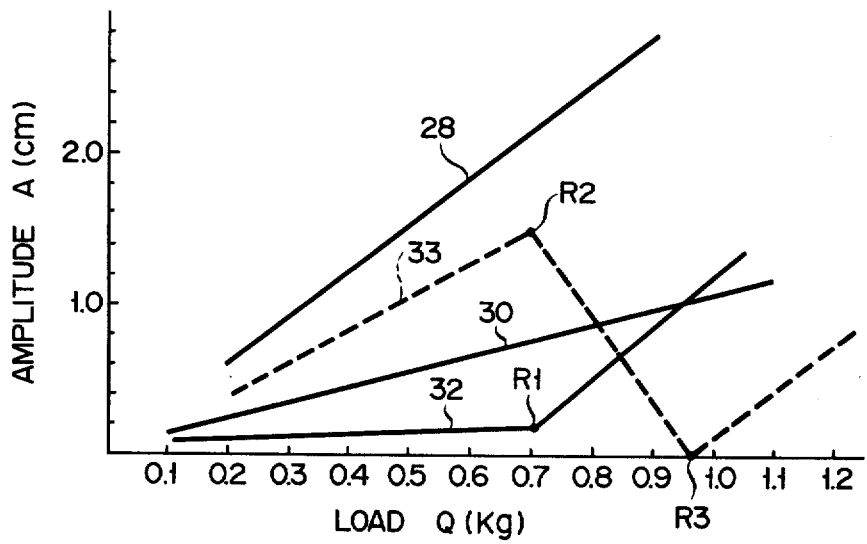
FIG. 2 is a characteristic linear diagram of the vibration reducing actions of a liquid balancer, solid balancer and ball balancer at the time when each balancer is equipped to the electric washing machine.
Figure 3:
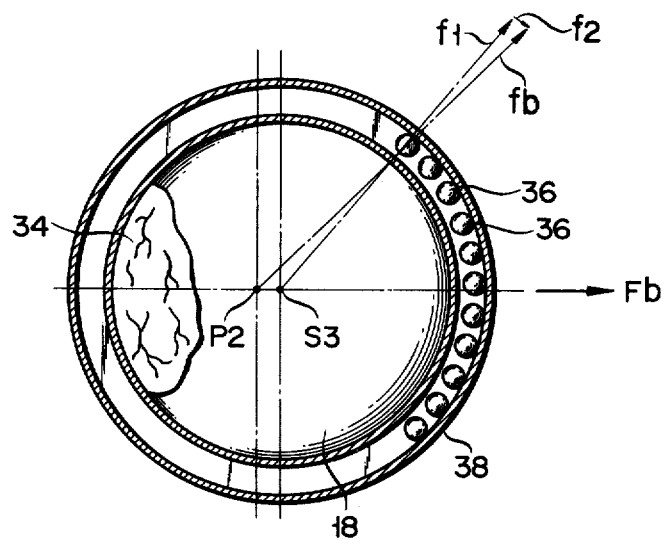
FIG. 3 is a plan view showing the operating condition of the ball balancer.
Figure 4:
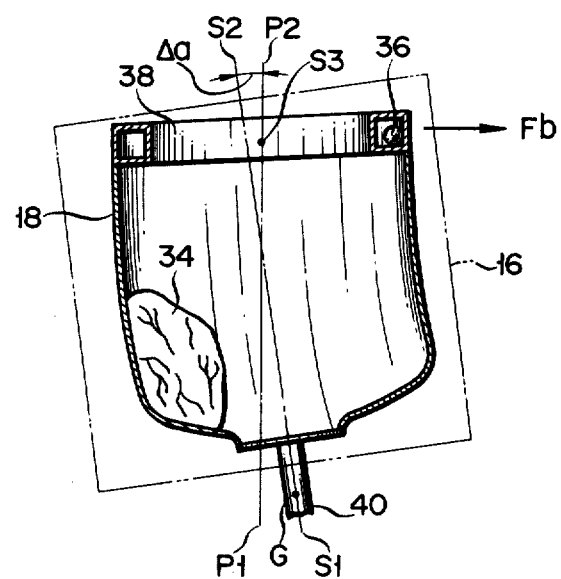
FIGS. 4 and 5 are vertically sectional views schematically showing the flexure or deflection of a rotary tub of the electric washing machine which occurs at the time when that rotary tub is equipped with the ball balancer.
Figure 5:
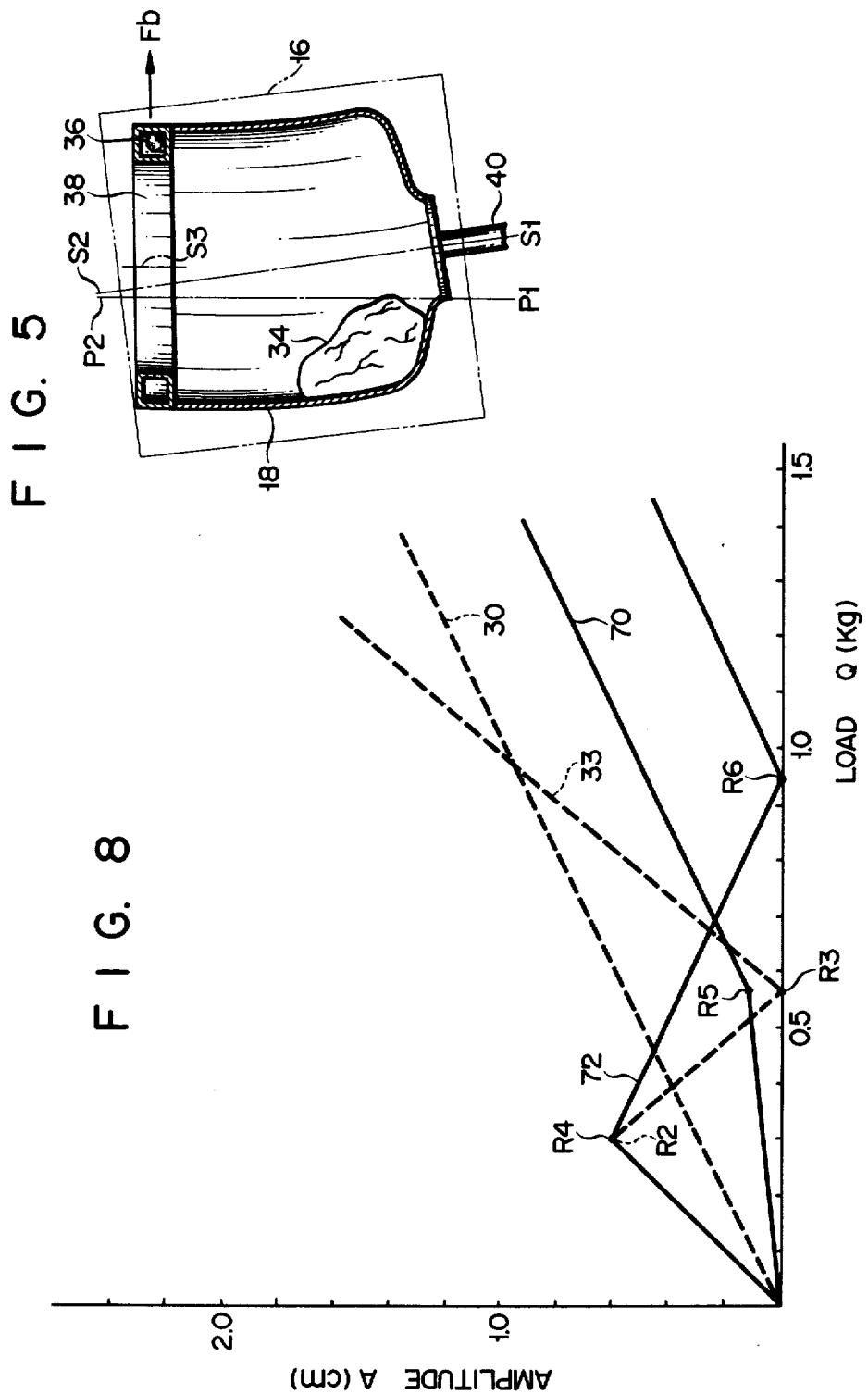

In FIG. 8, a characteristic linear diagram of the balancer 50 is shown. A characteristic line 70 indicates the theoretical characteristic of the balancer 50 when the rotary tub 18 is not bent or flexed at all, while a characteristic line 72 indicates a substantial characteristic of the balancer when the rotary tub is flexible. In FIG. 8, the characteristic lines 30, 33 shown in FIG. 2 are shown in broken lines in order to compare the conventional balancer. When the dehydration operation of rotary tub 18 has begun, the spherical bodies 62 and operating liquid W do not receive a great centrifugal force during the low ratating rate proceeding the resonance rotating rate. As a result, they do not rotate integrally with the annular casing 58 but tend to circumferentially move within the receiving chamber 58 independently of the unbalanced load in the rotary tub 18. However, the movements inside the chamber 58 of the spherical bodies 62 and the operating liquid W are checked by the partitioning wall 64, so that they are both rotated substantially integrally with the annular casing 58. When the rotating rate of the rotary tub 18 comes to exceed the resonance rotating rate, the spherical bodies 62 and the operating liquid W are accelerated, due to the existence of the partitioning wall 64, to the extent that both are rotated integrally with the rotary tub 18. Therefore, each spherical body 62 is moved by the action of the resulting centrifugal force along the inclined portion 67 up to the terminal end 68 thereof. Since the inner circumferential surface of the outer circumferential wall 56B extending from and above that terminal end 68 is formed vertically, the raising force acting on each spherical body 62 vanishes when the spherical body 62 reaches the terminal end 68. Accordingly, it is impossible for the spherical body 62 to abut against the upper wall 56C and push up the upper wall 56C. Thus, it is also impossible for an unnecessary external force to act on the upper wall 56C. Each spherical body 62, upon reaching the terminal end 68 of the inclined portion 67, becomes freely and circumferentially movable through the opening 66 without being checked by the partitioning wall 64. Similarly, the operating liquid W is shifted, due to the centrifugal force, to the outer peripheral portion of the receiving chamber 58, and thus becomes circumferentially and freely movable through the opening 66.

Where the rotary tub 18 contains an unbalanced load, the spherical bodies 62 and operating liquid W are moved, within the receiving chamber, to the side opposite to that on which the unbalanced load of the rotary tub is located. If, in this case, the weight of unbalanced load is less than that corresponding to the marginal point of unbalance absorption of the spherical bodies 62, only the spherical bodies 62 are moved, owing to their characteristics, to the side of the rotary tub 18 and absorb the unbalance of the same. The marginal unbalance-absorption point of the spherical bodies 62 is shown by the points $R_4$ and $R_5$ in FIG. 8. When the weight of unbalanced load is smaller than that corresponding to the point $R_4$ or $R_5$, the unbalance absorbing effect of the ball balancer is mainly put into action. In contrast, where the weight of unbalanced load is greater than that corresponding to the marginal points $R_4$, $R_5$ of the unbalance absorption of the spherical bodies 62, since all the spherical bodies have remained together, they are unable to absorb the unbalance of the rotary tub 18. As a result, the rotary tub 18 is kept unbalanced. For this reason, the operating liquid W is shifted to the side opposite to that on which the unbalanced load is located, thereby absorbing the unbalance of the rotary tub 18. In this way, when the weight of unbalanced load exceeds that corresponding to the marginal point $R_4$ or $R_5$ of the unbalance absorption of the spherical bodies 62, the unbalance absorbing effect of the liquid balancer is mainly put into action. Accordingly, as shown in FIG. 8, the characteristic line 72 of the balancer 50 when the rotary tub 18 is flexible, owing to the additional effect of the liquid balancer, becomes gentle in inclination in the region of the unbalanced load higher than that corresponding to the marginal point $R_4$ as compared with the characteristic line 33 of the conventional ball balancer in the region of the unbalanced load higher than that corresponding to the marginal point $R_2$. This means that the extend or width of variation in the unbalance absorbing effect relative to the variation in the weight of unbalanced load, insofar as concerning the region wherein the weight of unbalanced load exceeds that corresponding to the marginal point of unbalance absorption, is smaller than that the prior art balancer. Even when the rotary tub 18 is not bent or flexed at all, the characteristic line 70 of the balancer 50, as seen from the marginal point $R_5$ and succeeding rightward line portion of FIG. 8, becomes parallel to the characteristic line 30 of the liquid balancer. Thus, the characteristic of the balancer 50 is improved, in respect of the variation width of the unbalance absorbing effect, as compared with the characteristic of the ball balancer indicated in the characteristic line 32 of FIG. 2.

As above described, according to the balancer 50, the width of variation in the unbalance absorbing effect relative to the variation in the weight of unbalanced load can be reduced by the extremely simplified construction wherein the operating liquid W and spherical bodies 62 are housed in one receiving chamber 58. In addition, the vibration reducing effect greater than that of the liquid balancer can be obtained also by such simplified construction. Further, according to the balancer 50, since the annular casing 56 is provided with the partitioning walls 64, while the rotary tub 18 is rotated at low rotating rate or at a rotating rate lower than that corresponding to resonance rotating rate, the operating liquid W and the spherical bodies 62 are prevented from making unruly movements. This eliminates the possibility of the operating liquid W and the spherical bodies 62 being shifted to the unbalanced load while the rotary tub is being rotated at a rate lower than that corresponding to the resonance rotating rate. Further, since each of the spherical bodies 62 is formed of synthetic resin or natural rubber container powdered lead oxide, they are prevented from corroding or generating noises due to collision with one another or with the casing. Further, since the operating liquid used is a solution of salt, that is, a liquid having low viscosity, it hardly obstructs the movements of the spherical bodies. According to the balancer 50, therefore, the variation of the vibration-reducing effect relative to the same weight of unbalanced load is reduced, thereby obtaining an unbalance-absorbing effect which is approximate to that theoretically obtained. Further, by using as the operating liquid a solution of salt having a low freezing point, the balancer 50 has the effect of preventing the operating liquid from freezing frozen even when that balancer is used in a cold district.

It is to be noted that the balancer for use in a centrifugal rotary machine according to the invention is not limited to application to an electric washing machine with dehydrating function, but can also applied to any type of centrifugal rotary machine.

What we claim is:

1. A balancer used in a centrifugal rotary machine for reducing the vibration of support means for supporting a cylindrical rotary tub, which occurs due to the existence of an unbalanced load in the rotary tub, comprising:
    an annular casing having an annular receiving chamber therein and attached to the rotary tub coaxially;
    a low-viscous operating liquid cirumferentially and flowably sealed in the annular receiving chamber and, as the rotary tub rotates, flowing to the side opposite to that on which the unbalanced load of the rotary tub is located to absorb the unbalance of the rotary tub; and
    a plurality of spherical weights circumferentially movable disposed in the annular receiving chamber and, as the rotary tub rotates, moved to the side opposite to that on which the unbalanced load of the rotary tub is located to absorb the unbalance of the rotary tub, each spherical weight being formed of an elastic material containing powdered lead oxide.

2. The balancer used in a centrifugal rotary machine according to claim 1, wherein said annular casing is arranged on the inside of one end portion of the rotary tub.

3. The balancer used in a centrifugal rotary machine according to claims 1, wherein said annular casing has a plurality of partitioning walls disposed in the annular receiving chamber in such a manner that they are circumferentially spaced at predetermined intervals from each other and, while the rotary tub rotates with a lower rotating rate than that specified, regulating the circumferential movement of the operating liquid and spherical weights and, while the rotary tub rotates with a rotating rate equal to or higher than that specified, permitting the circumferential movement of the operating liquid and spherical weights.

4. The balancer used in a centrifugal rotary machine according to claim 3, wherein said annular casing has mutually opposed inner and outer circumferential walls as well as mutually opposed top and bottom walls, the annular receiving chamber being defined by those walls; and the partitioning walls are so disposed as to divide the annular receiving chamber into a plurality of compartments and each have an opening which is formed in the part of its upper portion located on the side of the outer circumferential wall of the annular casing, which permits two adjacent compartments on both sides of the corresponding partitioning wall therebetween to communicate with each other therethrough and which permits the operating liquid and spherical weights to pass therethrough from one of the two adjacent compartments to the other.

5. The balancer used in a centrifugal rotary machine according to claim 4, wherein the inner surface of said outer circumferential wall of the annular casing has an inclined portion extending from the inner surface of the bottom wall thereof up to a position of the opening in such a manner that the inclined portion is inclined radially and outwardly of the annular casing; and each of the spherical weights, during the rotation of the rotary tub with a rotating rate equal to or higher than that specified, rises along the inclined portion due to the action of the resulting centrifugal force acting on the spherical weight, to be thereby circumferentially movable through the opening.

6. The balancer used in a centrifugal rotary machine according to claim 3, wherein the amount of said operating liquid is set at a value making the annular receiving chamber less than full of the operating liquid and also keeping the operating liquid in the chamber to have a surface level located within the opening of the partitioning wall.

7. The balancer used in a centrifugal rotary machine according to claim 1, wherein said elastic material is synthetic resin or natural rubber.

8. The balancer used in a centrifugal rotary machine according to claim 1, wherein said operating liquid is water or a liquid having water as a basic component.

9. The balancer used in a centrifugal rotary machine according to claim 8, wherein said operating liquid is a liquid having a low freezing point.

* * * * *